(12) United States Patent
Montagne et al.

(10) Patent No.: US 9,121,352 B2
(45) Date of Patent: Sep. 1, 2015

(54) METHOD AND DEVICE FOR PURGING A GAS TURBINE LIQUID FUEL INJECTION SYSTEM

(75) Inventors: Pierre Montagne, Lay Saint Christophe (FR); Daniel Deloge, Belfort (FR); Alexandre Picard, Offemont (FR); Olivier Chapuis, Bavilliers (FR); Benoît Gartner, Rouffach (FR)

(73) Assignee: GE Energy Products France SNC, Belfort (FR)

( * ) Notice: Subject to any disclaimer, the term of this patent is extended or adjusted under 35 U.S.C. 154(b) by 881 days.

(21) Appl. No.: 13/275,338

(22) Filed: Oct. 18, 2011

(65) Prior Publication Data

US 2012/0137699 A1   Jun. 7, 2012

(30) Foreign Application Priority Data

Oct. 18, 2010   (FR) ...................................... 10 58473

(51) Int. Cl.
| | |
|---|---|
| *F02C 7/232* | (2006.01) |
| *F23K 5/18* | (2006.01) |
| *F02C 9/40* | (2006.01) |
| *F02C 7/22* | (2006.01) |
| *F23R 3/36* | (2006.01) |

(52) U.S. Cl.
CPC ... *F02C 9/40* (2013.01); *F02C 7/22* (2013.01); *F02C 7/232* (2013.01); *F23K 5/18* (2013.01); *F23R 3/36* (2013.01); *F05D 2260/602* (2013.01); *F05D 2260/607* (2013.01); *F23K 2301/203* (2013.01); *F23N 2027/04* (2013.01); *F23N 2027/06* (2013.01); *F23N 2037/08* (2013.01)

(58) Field of Classification Search
CPC ................ F02C 6/04; F02C 6/06; F02C 6/10; F02C 7/22; F02C 7/222; F02C 7/232; F02C 9/263; F02C 9/28; F02C 9/36; F05D 2260/602; F05D 2270/301; F05D 2270/3011; F05D 2270/3013; F05D 2270/3015; F23R 3/28; F23R 2900/00004; F23R 5/18; F23R 2301/203
USPC ........................................ 60/39.094, 734, 739
See application file for complete search history.

(56) References Cited

U.S. PATENT DOCUMENTS

| | | | |
|---|---|---|---|
| 6,145,294 A * | 11/2000 | Traver et al. ..................... 60/776 |
| 6,393,827 B1 * | 5/2002 | Nakamoto ................ 60/39.094 |
| 2001/0022080 A1 * | 9/2001 | Tanaka et al. .............. 60/39.465 |
| 2003/0200754 A1 * | 10/2003 | Futa et al. ........................ 60/776 |
| 2006/0150631 A1 * | 7/2006 | Smith et al. ..................... 60/772 |

* cited by examiner

*Primary Examiner* — Andrew Nguyen
(74) *Attorney, Agent, or Firm* — Mintz Levin Cohn Ferris Glovsky and Popeo, P.C.; Steven M. Jensen

(57) ABSTRACT

A device for purging a feed device that supplies liquid fuel to a gas turbine includes a combustion chamber that can be supplied alternately with gaseous and liquid fuel, and a purge air circuit that includes a manifold to distribute air to the combustion chamber, and at least one valve for regulating the air pressure in the purge air circuit. The purge device includes an electronic control unit that makes it possible to regulate the air pressure and flow rate in the purge air circuit according to the mode of operation of the gas turbine.

6 Claims, 1 Drawing Sheet

METHOD AND DEVICE FOR PURGING A GAS TURBINE LIQUID FUEL INJECTION SYSTEM

BACKGROUND OF THE INVENTION (1) Field of the Invention

The invention relates to gas turbines and, more specifically, to liquid fuel injection systems for industrial gas turbines.

In particular, the present invention relates to a device for purging the systems that inject fuel into the gas turbines.

(2) Description of the Related Art

Gas turbines generally comprise an air intake system, a compressor with one or more compression stages having an air flow rate regulating device, an internal combustion system, an expansion turbine connected mechanically to the compressor, and a system for discharging the exhaust gases. Gas turbines are designed with combustion systems capable of injecting liquid fuel and/or gaseous fuel into the combustion system, via concentric injectors for example. However, certain gas turbines are capable of running alternately on liquid fuel and on gaseous fuel such as, for example, natural gas. In general, gas turbines burn each of the liquid and gaseous fuels alternately. Thus, when the gas turbine is burning a liquid fuel, the supply of gaseous fuel is cut off and when the gas turbine is burning a gaseous fuel, the supply of liquid fuel is cut off. During the switchover from liquid fuel to gaseous fuel, the pressure in the liquid fuel circuit drops gradually while the pressure in the gaseous fuel circuit gradually increases. This type of gas turbine entails a purge system auxiliary to the liquid fuel injection system to eliminate the liquid fuel present in the injectors of the combustion chamber and thus provide the injectors with a continuous cooling air stream. The purge system is generally switched into operation when the liquid fuel supply system starts or is shut down. This is because it is necessary to purge the liquid fuel supply circuit to prevent liquid fuel remaining in a high-temperature region near the combustion chamber which could lead to coking of the liquid fuel, namely to solidification of the liquid within the supply circuit and therefore progressive degradation of the operation of the gas turbine, blocking of valves, pipes, check valves.

One solution for purging the liquid fuel is to use compressed air or a liquid.

In this respect, reference may be made to document EP 0 949 454 which comprises a complex purge system comprising a purge air supply valve combined with a soft purge valve, a non-return check valve and a multi-orifice purge valve directing the purge air towards the injectors. However, this type of purge system proves complex.

Reference may also be made to document U.S. Pat. No. 6,438,963 which describes a purge system comprising a three-way valve to reduce the residual quantity of liquid fuel and effectively avoid combustion gases returning to the liquid fuel supply circuit and to the purge circuit.

However, because it is difficult to regulate the pressure of the purge air, the use of compressed air leads to sudden purges of liquid fuel into the combustion chamber, leading to a sudden increase in the power of the gas turbine.

In order to alleviate this disadvantage, the prior art proposes lengthening the purge time. However, lengthening the purge period means that the residual liquid fuel flow rate needs to remain constant during purging, which it rarely does. In addition, such a solution entails a highly complex purge control system that is difficult to install.

SUMMARY OF THE INVENTION

It is an object of the present invention to propose a purge system that is effective and robust while at the same time avoiding the propagation of fuel leaks into the purge system.

It is another object of the invention effectively to control the purging of the liquid fuel supply circuit and to ensure good air pressure and flow rate conditions during purging so as to allow the purge time to be lengthened, while at the same time being easy to install.

According to one aspect, the invention proposes a device for purging a system that supplies liquid fuel to a gas turbine comprising a combustion chamber that can be supplied alternately with gaseous and liquid fuel, comprising a purge air circuit comprising a manifold able to distribute the air to the combustion chamber, and at least one air pressure regulating means for regulating the air pressure in the purge circuit.

The purge device comprises an electronic control unit intended to lengthen the purge time by regulating the air pressure and flow rate in the purge circuit according to the mode of operation of the gas turbine, and more particularly as a function of the pressure in the combustion chamber.

Thus, the purge period is lengthened while at the same time ensuring good air flow rate and pressure conditions during purging irrespective of the mode of operation of the gas turbine.

Advantageously, the purge device comprises a second pressure regulating means situated between the first regulating means and the manifold, and a means of controlling the opening of the first regulating means and of the second regulating means according to the pressure measured in the purge circuit and in the combustion chamber. The second regulating means makes it possible both to discharge any leaks of fuel in the purge circuit and to regulate the air pressure in the intake manifold.

The purge device may comprise an air isolation valve mounted downstream of the manifold and a fuel isolation valve mounted between the liquid fuel supply circuit and the air isolation valve.

Further, the first pressure regulating means can be actuated upon the closure or opening of the fuel isolation valve.

Advantageously, the purge device comprises pressure measuring means that measure the pressure in the purge circuit and in the combustion chamber, a first measuring means being situated between the first pressure regulating means and the manifold, and a second measuring means being situated in the combustion chamber downstream of an injector.

The purge device may comprise an orifice situated downstream of the second pressure regulating means, so as to limit the leakage flow rate when the first pressure regulating means is opened.

In another aspect, the invention relates to a method for purging a feed device that supplies liquid fuel to a gas turbine comprising a combustion chamber that can be supplied alternately with gaseous and liquid fuel, the said device comprising a purge air circuit comprising a manifold able to distribute the air to the combustion chamber, and at least one air pressure regulating means for regulating the air pressure in the purge circuit, in which the air pressure and flow rate in the purge circuit are regulated according to the mode of operation of the gas turbine, and in particular the pressure in the combustion chamber.

Advantageously, the first regulating means and a second pressure regulating means situated between the first regulating means and the manifold are controlled as a function of the pressure measured in the purge circuit and in the combustion chamber.

When the liquid fuel supply is shut off or in the process of being shut off, the first regulating means is opened in order to supply the manifold with purging air and an air isolation valve is opened allowing the air to be distributed from the manifold into the combustion chamber.

BRIEF DESCRIPTION OF THE DRAWINGS

Further advantages and features of the invention will become apparent from examining the detailed description of one entirely non-limiting embodiment of the invention, and from studying the attached drawings, in which.

DETAILED DESCRIPTION OF THE INVENTION

Figure 1:
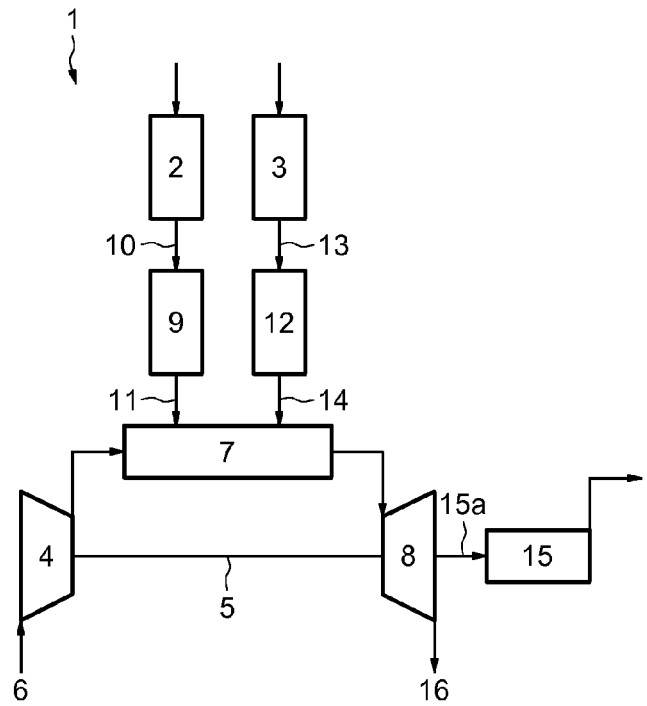
FIG. 1 schematically depicts a gas turbine.

FIG. 1 schematically depicts a gas turbine 1 supplied alternately with a liquid fuel and with a gaseous fuel such as natural gas for example, these fuels respectively coming from tanks 2 and 3. Gas turbines are generally used in electric power stations to drive generators and produce electrical power or for mechanical drive (compressor, pumping station, etc.). The gas turbine 1 comprises an axial compressor 4 comprising a rotor shaft 5. Air is introduced via the inlet 6 of the compressor 4 and is compressed by the axial compressor 4 before being directed towards a combustion chamber 7. The combustion chamber 7, which is also supplied with gaseous and liquid fuel, upon combustion produces high-energy hot gases capable of driving a turbine 8. Gaseous fuel may be conveyed from the tank 2 to the combustion chamber 7 by a gaseous fuel supply device 9 which comprises an inlet 10 connected to the tank 2 and an outlet 11 connected to the combustion chamber 7. Likewise, liquid fuel may be conveyed from the tank 3 to the combustion chamber 7 by a liquid fuel supply device 12 which comprises an inlet 13 connected to the tank 3 and an outlet 14 connected to the combustion chamber 7.

In the turbine 8, the energy of the hot gases is converted into work, some of which is used to drive the compressor 4 via the rotor shaft 5, and the rest of which is used to drive an electricity producing generator 15 via a shaft 15a. The exhaust gases then leave the turbine 8 via an outlet 16 and can be used for other applications.

Figure 2:
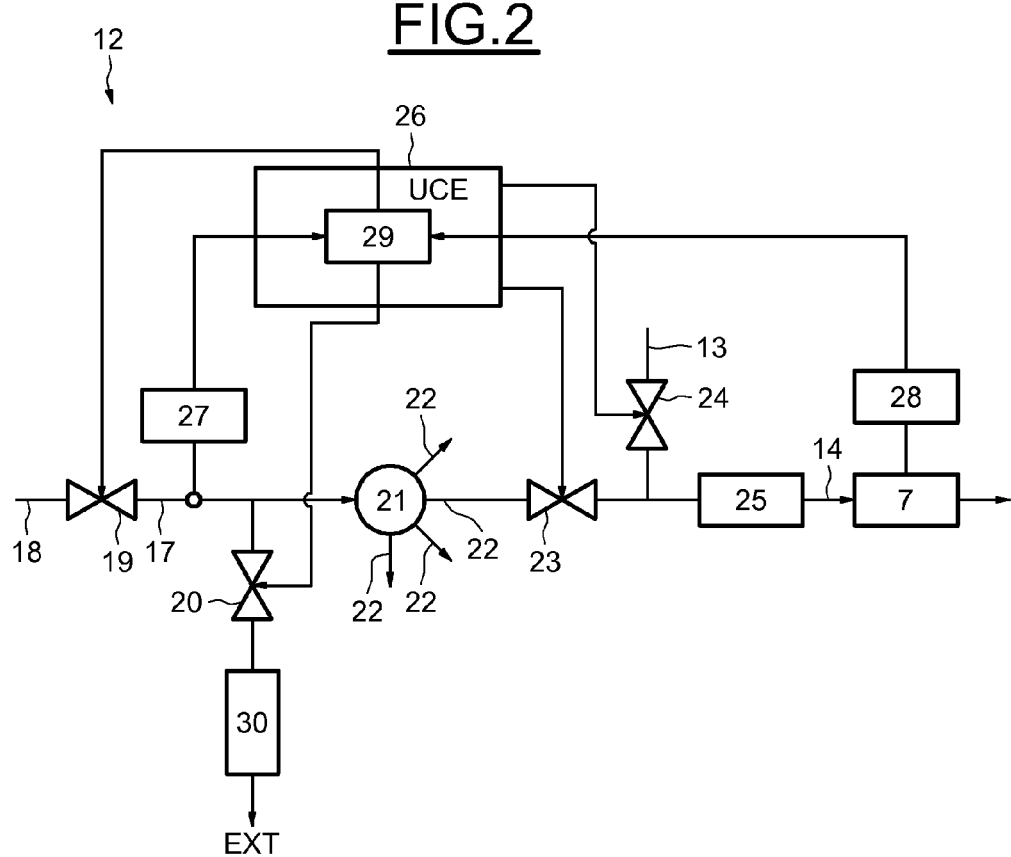
FIG. 2 schematically depicts a liquid fuel supply device according to FIG. 1.

FIG. 2 depicts in greater detail the device 12 for supplying liquid fuel to the combustion chamber 7. The supply device 12 comprises an inlet 13 to receive liquid fuel from the tank 3, outlets 14 for supplying the combustion chamber 7 with the liquid fuel and a purge circuit 17 connecting a purge air receiving inlet 18 to the outlets 14 and to the fuel inlet 13. The line 17 carrying the purge air comprises in succession, in the direction in which the air flows: a main valve 19 and a depression valve 20 which are respectively connected to the inlet 18 and to the external atmosphere EXT; an intake manifold 21; and supply lines 22 mounted downstream of the intake manifold 21 and each comprising an isolating valve 23 mounted upstream of an outlet 14 to the combustion chamber 7. The liquid fuel supply circuit 13 comprising an isolating valve 24 is connected in between the isolating valve 23 and an injector 25.

In the example illustrated, one single supply line 22 has been depicted. It will be noted that the device could, by way of non-limiting example, comprise a number of supply lines greater than or equal to 1, according to the number of combustion chambers in the turbine.

The main valve 19 allows the intake manifold 21 to be supplied with air when liquid fuel is not being injected into the combustion chamber 7 and allows the supply of purge air to be interrupted when liquid fuel is being injected into the combustion chamber 7. This valve 19 also makes it possible to regulate the purge air pressure in order to obtain a controlled purge.

The depression valve 20 allows the conveying line 17 and the intake manifold 21 to be purged of any leaks from the isolating valve 23 when the turbine is being supplied with liquid or gaseous fuel and the isolating valve 23 is closed and allows the pressure in the intake manifold 21 to be regulated.

The isolating valve 23 allows the purge air supply to be interrupted when liquid fuel is being injected into the combustion chamber 7.

The isolating valve 24 determines the amount of liquid fuel delivered to the injectors 25 and allows the supply of liquid fuel to the injectors 25 to be interrupted.

The liquid fuel supply device 12 aims to determine and to control the amount of liquid fuel delivered to the combustion chamber 7 in order, notably, to allow the gas turbine 1 to operate under conditions in which it operates at high efficiency with limited aging. In addition, the supply device 12 comprises a purge device 17 making it possible to purge the liquid fuel present in the injectors 25 when the turbine 1 is no longer being supplied with liquid fuel, thus avoiding the formation of coke.

Thus, upon changes to the fuels supplied it is important to avoid the presence of residual liquid fuel in the injection system 25.

The supply device 12 for that purpose comprises an electronic control unit 26. The control unit 26 is able on the one hand to determine the amount of fuel to be delivered to the combustion chamber 7, and to control the valves 19, 20, 23 and 24, for example the opening and closing thereof, or even the degree of opening thereof. In order to determine how to control the valve 19, the control unit 26 receives information relating to the pressure between valves, which information is supplied by a sensor 27, and to the pressure in the combustion chamber, which pressure data is supplied by a sensor 28 situated after the injectors 25. This pressure data is then collected by a control means 29 which determines the purge pressure ratio and forces the position of the main valve 19 according to this ratio.

In general, when liquid fuel is flowing towards the combustion system 7 of the gas turbine 1, the fuel purge system is at rest and the isolating valve 23 prevents any reflux of fuel into the purge circuit 17. However, upon the switch in fuel source, the opening of the valve 19 may be triggered before the isolating valve 24 is completely closed.

Thus, when supplying the gas turbine 1 with liquid fuel, the isolating valve 23 is closed and the isolating valve 24 is open so as to supply the gas turbine 1 with liquid fuel, and when the gas turbine 1 is no longer being supplied with liquid fuel, the isolating valve 23 is opened and the isolating valve 24 is closed so as to ensure that any leaks are removed.

The depression valve 20 may be opened or closed independently of the position of the valves 19, 23 and 24 so as to allow any purge air or fuel leaks to leave the gas turbine 1.

Likewise, the main valve 19 can be opened or closed independently of the position of the valves 20, 23 and 24 in order either to purge towards the combustion chamber 7 or towards the exterior EXT, or to cool the injectors 25.

An orifice 30, for example a throttling orifice, may be mounted downstream of the depression valve 20 to limit purge air leaks when the main valve 19 is open.

Thanks to the invention that has just been described, a device and a method are obtained for purging a liquid fuel supply circuit that are robust and effective and allow the purge time to be lengthened while in an effective manner ensuring that the air pressure and flow rate conditions remain suitable during the purging. In addition, such a device makes it possible effectively to avoid the propagation of leaks of fuel into the purge circuit.

The invention claimed is:

1. A device for purging a feed device that supplies liquid fuel to a gas turbine, comprising:
   a combustion chamber that can be supplied alternately with gaseous and liquid fuel; and
   a purge air circuit including a manifold able to distribute air to the combustion chamber, a first valve for regulating air pressure in the purge air circuit, and a second valve located between the first valve and the manifold,
   wherein the purge air circuit comprises an electronic control unit receiving information relating to a pressure between the first and second valves supplied by a first sensor located between the first valve and the manifold, and a pressure in the combustion chamber being supplied by a second sensor located in the combustion chamber downstream of an injector, the electronic control unit being configured to lengthen the purge time by controlling opening of the first and second valves according to the pressure measured in the purge air circuit and the combustion chamber.

2. The device according to claim 1, further comprising an air isolation valve mounted downstream of the manifold and a fuel isolation valve mounted between the liquid fuel supply circuit and the air isolation valve.

3. The device according to claim 2, wherein the first valve can be actuated upon the closure or opening of the fuel isolation valve.

4. The device according to claim 1, further comprising an orifice situated downstream of the second valve, so as to limit the air leakage flow rate when the first valve is opened.

5. A method for purging a feed device that supplies liquid fuel to a gas turbine comprising a combustion chamber that can be supplied alternately with gaseous and liquid fuel, and a purge air circuit including a manifold able to distribute the air to the combustion chamber, a first valve for regulating air pressure in the purge air circuit, and a second valve located between the first valve and the manifold,
   wherein opening of the first and second valves is controlled as a function of the pressure measured in the purge air circuit and in the combustion chamber.

6. The method according to claim 5, wherein when the liquid fuel supply is shut off or in the process of being shut off, the first valve is opened in order to supply the manifold with purging air and an air isolation valve is opened allowing the air to be distributed from the manifold into the combustion chamber.

* * * * *